June 15, 1926. 1,588,668
W. L. FAIRCHILD
VULCANIZING APPARATUS
Filed Dec. 10, 1921 3 Sheets-Sheet 2
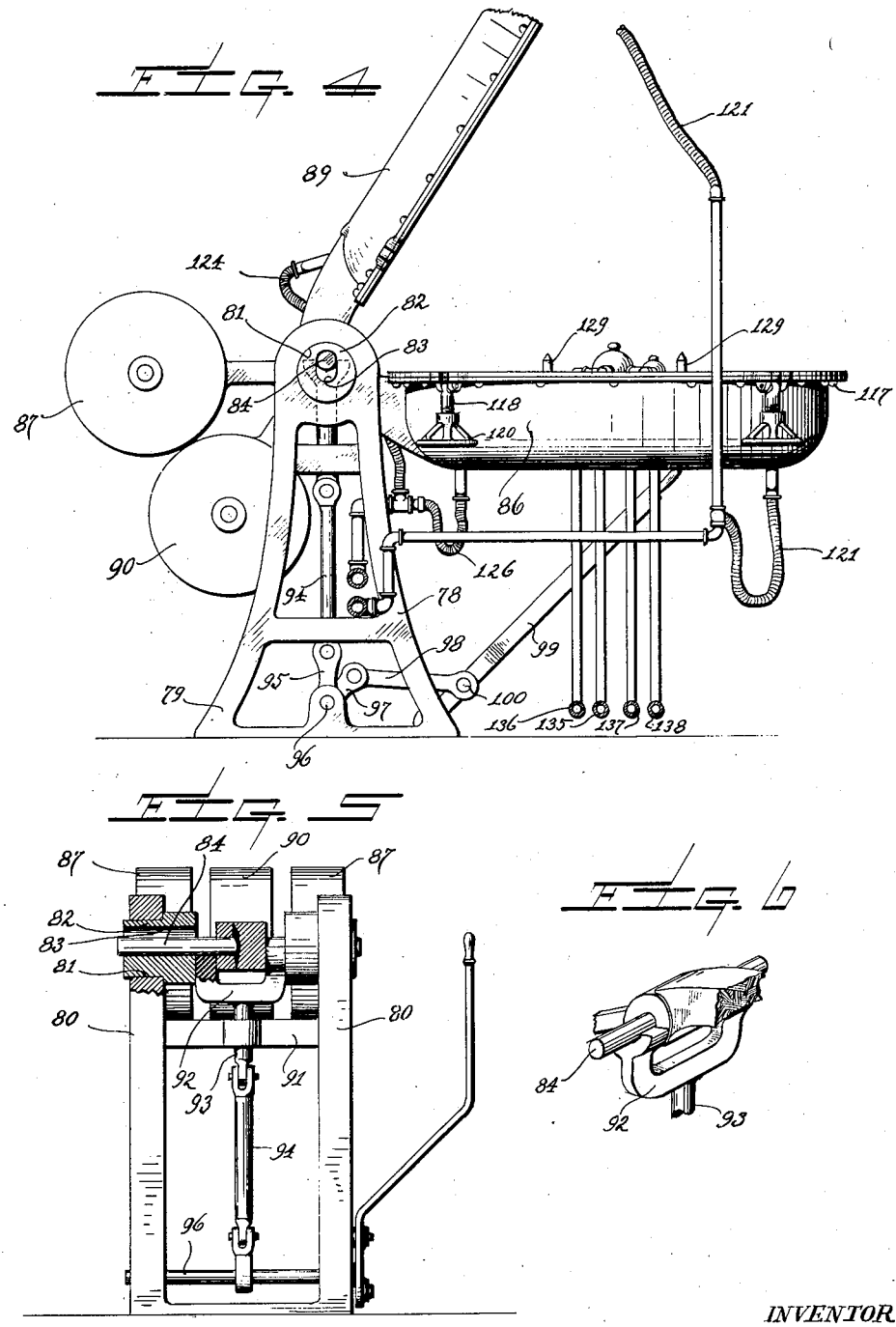
INVENTOR.
WALTER L. FAIRCHILD.
BY
ATTORNEY.

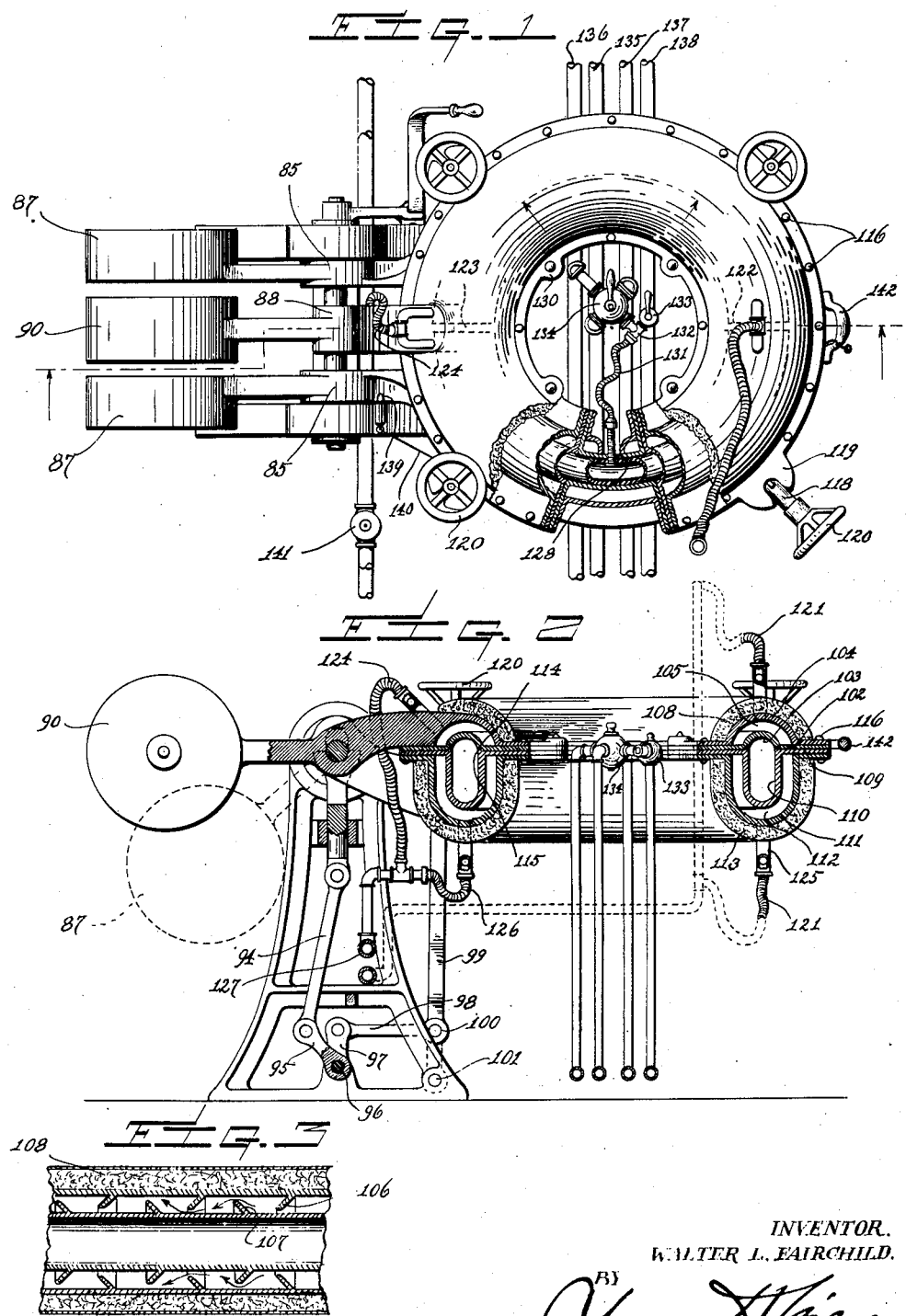

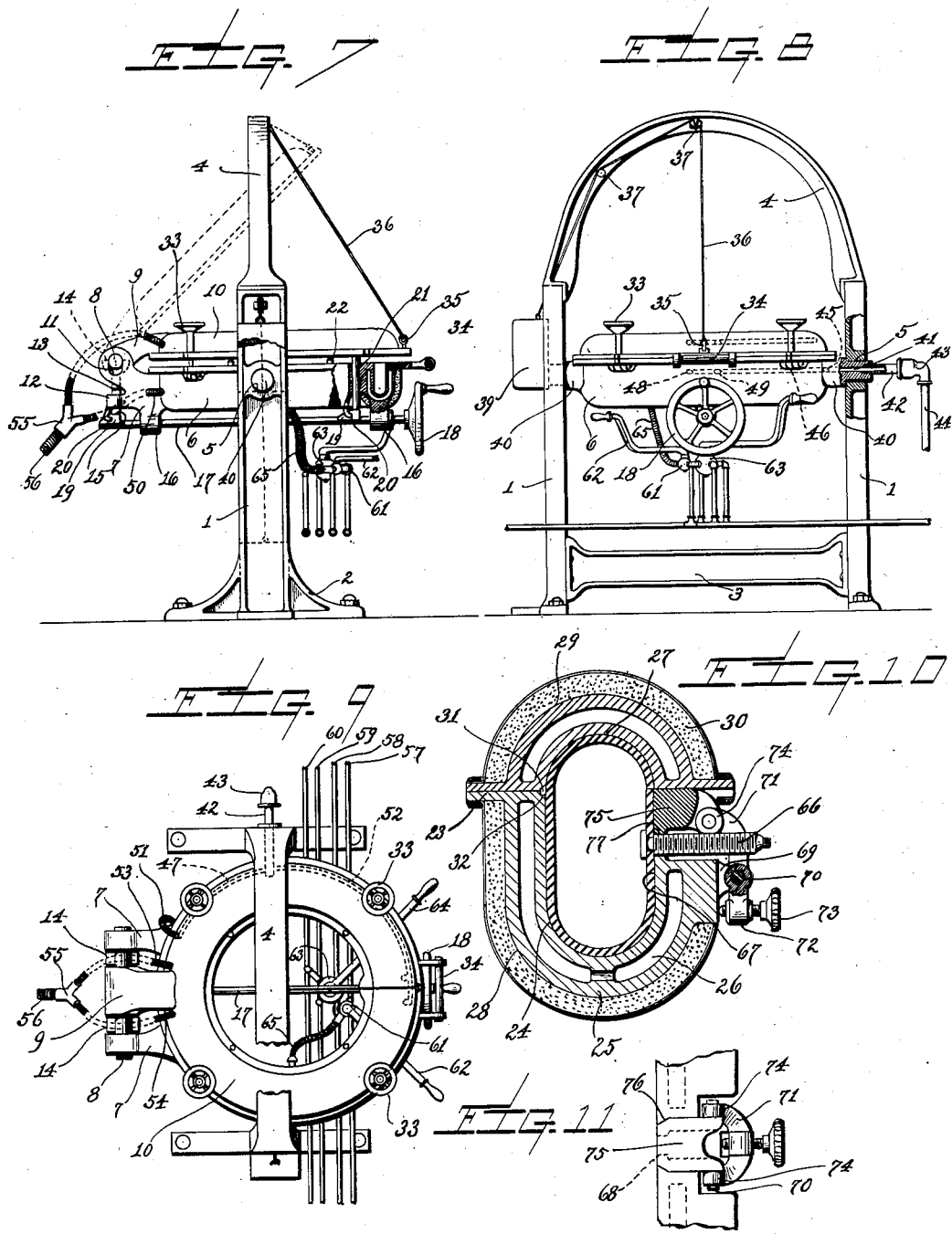

Patented June 15, 1926.

1,588,668

UNITED STATES PATENT OFFICE.

WALTER L. FAIRCHILD, OF NEW YORK, N. Y.

VULCANIZING APPARATUS.

REISSUED

Application filed December 10, 1921. Serial No. 521,391.

This invention relates to a new and improved vulcanizing apparatus which is applicable to the vulcanization of hollow articles such as play balls, but of especial utility in carrying on the vulcanizing process in connection with endless tubes, commonly known as inner tubes and used within outer casings or shoes to form a pneumatic vehicle tire. The machine which forms the subject matter of the present application is of the type in which the article to be treated is placed in a mold and the vulcanization carried on with the article confined.

In vulcanizing processes in which a mold is employed, the former methods consisted of placing the article to be vulcanized in a mold formed of two or more sections clamped together to form a mold chamber. A number of articles were placed in separate molds and the molds placed in a steam chest or other heater, the several articles being vulcanized at the same time. The articles, before being placed in the molds, were blown up or expanded by introducing therein a quantity of air, which was of assistance in carrying on of the vulcanization in the inside of the tube. In some cases a small quantity of a liquid such as water or ammonia was placed inside the article, the liquid becoming gaseous under the action of heat during the vulcanization. A disagreeable and dangerous feature in connection with the old practice was that, upon completion of the vulcanizing process, the confined gas was exhausted from the article and as no provision was made for the carrying away of the gas it escaped into the atmosphere of the work-room producing a condition dangerous to the health of the workmen.

In the processes employing molds, it is to be noted that no means was provided for releasing the article from the mold after the operation was completed, save by manually releasing and removing the mold sections. As the article has a tendency to stick to the inside of the chamber in the vulcanizing process, it will be readily understood that such manual withdrawal causes an expensive percentage of loss due to tearing of the vulcanized product.

In employing the old methods, in which liquid was placed inside the article at the start, it was also impossible to control the pressure within the article except when the gas was first introduced, and there was no method by which the composition of the confined gas could be varied during the vulcanizing operation. It will be understood that the vulcanization of some articles will proceed more rapidly than others due to a variety of conditions and, as one of the results attained by the use of the vulcanizing gas is to obtain a vulcanization taking place equally on the interior as well as exterior surface of the article, it will be seen that differences in the rate of vulcanization may make it desirable to change the composition of the vulcanizing gas during the vulcanization.

In certain previous processes, a plurality of molds containing articles to be vulcanized were connected up to conduits supplying air or other gas, and the various molds all supplied from a common source located without the heating chamber. The gas so supplied to the molds could only be controlled so as to vary the temperature and pressure within a group of molds as a unit, and this made it virtually necessary that all the molds to be placed in the heating chamber at one time, should contain articles of the same kind, thickness, etc. It will be understood, of course, that it may be desirable to hasten or retard the vulcanizing process in some instances, and this may be readily accomplished by increasing or decreasing the temperature of the gas supplied to the interior of the article under treatment. With the earliest forms of molds, which were clamped together and placed in a steam chest, there was no means by which the gas confined within the tube might be altered in any way during the vulcanizing process. Once the article was clamped in the mold and the vulcanization begun, the operator had practically no control except of the steam pressure and temperature in the steam chest. With the process to which I have just referred, it was possible to vary the conditions in the interior of the molds but only as a group, which prevented different kinds of articles being vulcanized at the same time, since it was impossible to establish different conditions in the individual molds.

By the use of my new and improved vulcanizing machine, I provide means for vulcanizing play balls, inner tubes, or other articles of that character in which each mold may be heated separately and without moving the mold from place to place. I provide means further for controlling the temperature, pressure and composition of the vulcanizing gas and thereby of controlling the progress of the vulcanizing process. In addition to these features, my new and improved machine is easy to handle and, due to the possibility of introducing pressure both within and without the mold, I am enabled to make a much lighter mold structure than has heretofore been thought possible. Furthermore, by the new construction, I am able to obviate the loss of product due to tearing, pinching, or other injuries sustained during the vulcanizing process and I am further able to control the time element in vulcanizing more accurately since I can quickly exhaust the vulcanizing gas from the interior of the tube and supply thereto a neutral medium. I am furthermore enabled by the use of my new and improved machine to control conditions in each individual mold as distinguished from the mass control to which I have previously referred. This enables me to use my machines in a battery all heated from a common source and the heat supply regulated by a single automatic valve. This is the equivalent of heating a plurality of molds in a single chamber but with my invention it is possible to control the vulcanization of each individual article, a feature which is of great importance when it is desired to vulcanize articles which differ so materially as for instance, light inner tubes having a thickness of perhaps 0.1 inch and, for truck tires, in which the tube is 0.25 inch thick. My new device is especially useful in the treatment of articles which are to have their exterior surfaces corrugated or otherwise roughened, inasmuch as these tubes may be quickly loosened and removed from the mold without injury to such corrugations, which it will be understood are formed by forcing the article into suitable recesses on the interior surface of the mold.

One of the objects of the invention is to provide a new and improved machine for carrying on the vulcanizing process, so constructed that the pressure within the article under treatment can be controlled before, during, or after the vulcanizing period.

Another object is to provide a new and improved vulcanizing machine by which it is possible to control the temperature of the gases in the article before, during, and after vulcanization.

Another object is to provide a new and improved vulcanizing machine by which it is possible to control the chemical composition of the gases to be employed within the article during the vulcanizing process.

Another object is to provide a new and improved machine for vulcanizing in which it is possible to loosen the article from the walls of the mold before the mold is opened.

Another object is to provide a new and improved machine for vulcanizing, in which the gases employed within, the article in the vulcanizing process may be led away without exhaust into the room where the vulcanizing process is being carried on.

Another object is to provide a new and improved vulcanizing machine which is adapted to be used in batteries and so supplied with heat, but in which the conditions in individual molds may be readily and separately controlled.

Other objects and aims of the invention, more or less specific than those referred to above, will be in part obvious, and in part pointed out in the course of the following description of the elements, combinations, arrangements of parts and applications of principles, constituting the invention; and the scope of protection contemplated will be indicated in the appended claims.

In the accompanying drawings, wherein I have shown a preferred form of embodiment of my invention:

Figure 1 is a top plan view of the vulcanizing machine with parts broken away to show the interior of the vulcanizing chamber.

Figure 2 is a vertical transverse cross-section on the line A—A of Figure 1.

Figure 3 is a vertical longitudinal cross-section of the mold on the line B—B of Figure 1.

Figure 4 is an end view of the device with the upper half of the mold in raised position.

Figure 5 is a vertical longitudinal section on the line C—C of Figure 1, showing the mounting of certain parts.

Figure 6 is a detailed perspective view of certain parts shown in Figure 5 in partial section.

Figure 7 is a view in side elevation, with parts cut away, of a preferred embodiment of my invention.

Figure 8 is a view in end elevation of a machine shown in Figure 7, also with parts cut away.

Figure 9 is a plan view with parts cut away.

Figure 10 is a cross sectional view of a mold with an inner tube in place showing particularly the construction at the point where the valve stem passes through the mold walls; and Figure 11 is a detail view of certain parts by which provision is made for closing the aperture through which the valve stem protrudes.

In the drawings in which similar reference characters are used to designate similar parts throughout the several views thereof, the reference numerals 1—1 designate a pair of upright frame members having feet 2, and being rigidly held together by a cross bar 3. At their upper ends the frame members 1 support a U-shaped member or yoke 4. It will be understood that although I have shown the frame to be made with the various parts as just described, it is possible to form the frame of one piece. By means of a pair of bearings 5—5 in either frame member, there is pivotally supported the lower mold element 6, which is shown to be provided with integrally formed extending arms 7, having bearings in which there is journalled a shaft 8 mounted in an extension 9, formed integrally with the upper mold element 10. It will be seen that by this construction the upper and lower mold elements may be swung as a unit in the bearings 5, and that the upper mold element may also swing relatively to the lower element on the shaft 8. The shaft 8 is journalled in a slot-like bearing 11, in the extensions 7 of the lower mold element, and mounted in suitable guides 12 formed in the extensions 7, there is a rod 13 provided with a forked upper end, indicated at 14. The lower ends of this rod is beveled off, as indicated at 15, so as to form an inclined surface. Mounted in downwardly extending guides 16, formed integrally with the lower mold element, there is a shaft 17, provided with a hand wheel 18, and the shaft 17 is suitably threaded engaging interiorly formed threads in the guides 16, so that by a revolution of the hand wheel the shaft will move relative to the guides in a longitudinal direction.

Mounted on the shaft there is a pair of wedge-shaped blocks 19 which are keyed to the shaft so as to be moved longitudinally therewith, but which are prevented from rotation by suitable U-shaped guides 20, formed in the lower mold element. These blocks are mounted so as to engage the lifting rod 13 and also a similar rod 21, mounted in the lower mold element on the inner margin of the annulus at a point opposite the extension 7, and also provided with an inclined lower surface. By the construction described a revolution of the hand wheel will force the wedge-shaped blocks under the lifting rod, and force the shaft 8 upwardly in its slotted bearing, the forward end of the upper mold element at the same time being forced upwardly by the forward lifting rod 21, the upper end of which bears against the lower surface of the upper mold element. This permits the upper mold element to be moved a slight distance relatively to the lower mold element, the faces of the mold elements being at the same time maintained in parallel relation. This movement is directed by guide pins 22, mounted in the upper face of the lower mold element and engaging in suitable guide recesses in the upper mold element.

As indicated in Figure 10, the lower mold element consists of an annular metallic member having a wide flange 23 along either peripheral margin. Between these flanges the mold is U-shaped in section, the annular recess 24, and the lower mold being relatively deep and being provided with an enclosing wall 25, so that there is formed a steam-chest 26 between the inner and outer walls of the mold.

The construction of the upper mold element is similar to that of the lower, but the annular recess 27 is relatively shallow. Enclosing the outer surfaces 28 and 29 of both elements, there is provided a layer 30 of suitable lagging material, such as asbestos, so that the heat loss may be minimized. It will be understood that as the vulcanized article is to be placed within the molds the inner surface of the mold members must be accurately machined, to have a nice fit. This is further provided for by a bead 31, mounted on the upper element, which fits into a corresponding channel 32, in the lower element along the edge of the flange where contact is made.

As indicated at 33 the lower mold element is provided with a number of swinging clamping arms having suitable hand wheels which engage in corresponding recesses formed in the periphery of the upper mold element, so that when the two molds are laid together, face to face, they may be tightly clamped in that relation. The upper mold element is also provided with a handle 34 opposite the pivotal mounting and attached to the peripheral flange of the upper element, by means of a ring 35, is a chain or other flexible connection 36, which passes over suitable pulleys 37 in the U-shaped frame member, and which is attached at its other end to a counterweight 39, guided in the frame member 1. By the construction set forth it will be seen that it is possible to move the upper mold element a short distance with its faces parallel to the lower mold element, and then to move the upper element pivotally on the shaft 8 to the position indicated in the dotted lines in Figure 7. It is necessary that the upper half mold be so moved in order that a vulcanized article may be removed without injury, and when the upper half mold is swung to the dotted line position, it is possible to get at the inner surface of the mold for cleaning purposes. The heavy mold element may be easily handled by reason of the counterweight.

As shown in Figure 8, the lower mold element is provided with a pair of integrally formed trunnions 40, one of which is solid, and the other of which has a central bore 41, to which is attached a steam pipe 42, connected by means of a swivel joint 43 to a steam main 44. The bore 41 is tapped as indicated at 45 at a point close to the outer surface of the lower mold element, and mounted on this outer surface are pipes 46 and 47, the pipe 46 extending around the mold element to a point near the front of the machine, where it is provided with a pair of conduits 48 and 49, which communicate with the steam-chest 26. Between the inlets 48 and 49 the steam-chest has a partition so that the steam entering will pass therethrough in opposite directions to a point near the rear of the mold element, where it is exhausted through flexible tubing 50. The pipe 47 extends along the outer surface of the lower mold element, to a point near the rear thereof, where it is connected by means of a flexible conduit 51, to a pipe 52 mounted on the outer surface of the upper mold element. The pipe 52 extends about this surface to a point near the front of the machine, where it is provided with a pair of conduits communicating with the steam-chest in the upper mold element, which is also provided with a partition, as has been previously set forth. The steam-chests are also partitioned at the rear so that the exhaust steam is taken off by a pair of flexible conduits 53, 54, which communicate with a Y-connection 55 and in turn with the exhaust steam main 56. By means of the flexible connection described it will be possible to move the mold elements freely without injury to the steam pipe.

The steam supplied to the steam-chest comes from a steam main in which the pressure is automatically regulated, so that a single source of supply may be used for a number of vulcanizing machines set up in a battery, the pressure supplied to each machine being the same, and the steam exhausting into a common exhaust main. Underneath the machine there are a plurality of conduits numbered 57, 58, 59 and 60, conduit 57 containing a vulcanizing gas which is to be introduced into the interior of the article to be vulcanized. The conduit 58 contains air under pressure; the conduit 59 is for exhaust purposes, and the conduit 60 is a vacuum conduit. The conduit 57 is connected by a suitable riser to a valve 61 provided with a handle 62, which extends clear of the machine, and the conduits 58, 59 and 60 are connected to a three-way valve 63, also having an extended handle 64. The valves 61 and 63 are connected by a suitable connection and the valve 61 is in turn provided with a flexible tubing 65, which is to be connected with the conduit which leads through the walls of the mold element and communicates with the interior of the article to be vulcanized. In the case of an inner tube, this will naturally be the valve stem 66 (see Figure 10) while in the case of other hollow articles a suitable tube will be inserted through the wall of the article so that communication may be had with the interior thereof.

By means of the various conduits and the two valves it will be seen that it is possible to force vulcanizing gas into the interior of the article to be vulcanized, to remove this gas by connection with the vacuum conduit, and to force air under pressure into the interior of the article, and then to exhaust the air.

In the case of vulcanizing an inner tube which is provided with the usual valve stem 66, it will be understood that it will be necessary to provide some sort of a gate by which the tube may be placed in position with the stem extending through the walls of the mold so as to permit of communication with the flexible tube 65.

As will be seen the lower mold element has a much deeper mold chamber than the upper mold element, so that the inner tube in place will have its valve stem opposite the flat surface 67. In the margin of the lower element there is formed a suitable aperture 68 at the point where the valve stem is to protrude, and on the outer surface of the steam chamber, below this aperture, there is mounted in suitable projecting lugs 69 a shaft 70, having U-shaped arms 71 extending upwardly therefrom. The shaft has also mounted upon it downwardly extending arms 72, upon which is mounted an adjusting screw 73 with a suitable hand wheel. The U-shaped arm 71 has bearings 74 at the end of either branch, between which is pivotally mounted a closure member 75 formed with a wedged-shaped end, as indicated at 76, which fits into the wall of the mold element, and upon being forced into position by means of the action of the adjusting screw, lies flush with the inner mold surface.

In its lower edge the closure member 75 is provided with an aperture 77, which closely fits the valve stem 66, which projects outwardly and passes between the forked ends of the U-shaped arms 71. When it is desired to insert an article to be vulcanized in the mold, the upper mold element is swung clear in the position shown in the dotted lines, Figure 7. The article, for instance, an inner tube, is then placed in the position indicated at Figure 10, the closure member 75 having been swung upwardly in its pivotal mounting 74. The stem is then placed so as to register with the aperture of the lower surface of the closure member 75, which is then swung downwardly, and wedged into position by means of the adjusting screw 73. The upper half of the mold is then swung down so that the faces of the two mold elements are in engagement and the mold elements are then clamped together by the clamping means 33. The article is now in position to be vulcanized and this process is carried on as follows:

The flexible tube 65 is connected with the valve stem 66 and by means of the three-way valve the vacuum conduit is put into communication with the article. The handle 64 is then turned so as to shut off the vacuum conduit, a partial vacuum being maintained in the article. The valve handle 62 is now moved so as to open the gas conduit and gas is admitted to the interior of the article with such pressure and temperature conditions as are suitable according to the kind of material that is being vulcanized. It will be understood that the steam pressure is maintained at all times, being automatically adjusted in the main so that individual attention is not required in the case of any single machine.

With the article now filled with vulcanizing gas, the mold elements clamped together as shown in Figure 8, are swung about the pivots 5, to a position indicated in the dotted lines in Figure 7. This is to provide for the removal of condensation in the steam-chest, the water caused by the condensed steam being permitted to run off into the steam exhaust main.

When the vulcanization has been carried on for such a length of time as is necessary, the mold is swung down to the horizontal position and the gas main shut off. The handle of the three-way valve is now moved so that the vacuum pipe is connected with the interior of the article, so that the vulcanizing gas therein may be led away.

The handle of the valve is then moved so that the exhaust pipe will communicate with the article, and inasmuch as there is now a partial vacuum within the article, air at atmospheric pressure will flow into the article. The handle is then moved still further so that air under pressure will be forced into the tube for a short period, and the handle is then rapidly moved back and forth so that the air pressure exhaust and vacuum pipes will be alternately connected with the tube. This rapid inflation and deflation of the article will permit of its being worked loose from the walls of the mold, to which it has a tendency to stick. After a few movements of the handle it will be found that the article is free within the mold and may be readily removed.

The importance of this inflation and deflation process will be appreciated when it is considered that it is proposed to vulcanize inner tubes and other articles having a corrugated surface, the corrugations being formed of course by means of suitable recesses in the mold surfaces. Without some means of overcoming the tendency of the article to stick to the walls of the mold, it would be impossible to remove the vulcanized product without tearing or other injury.

After the article has been detached from the walls of the mold, the clamps 33 are loosened and the upper mold element swung upwardly by means of the handle 34, whereupon the closure member 75 is loosened and swung upwardly out of the way.

The finished article may then be readily removed, and after the interior surfaces of the mold have been cleaned it is ready for another operation.

While the operation of the vulcanizing machine has been explained in connection with an inner tube, which is provided with a valve stem, it will be readily understood that any hollow article may be vulcanized in the same way. It is only necessary to provide some means by which the vulcanizing gas conduits and the other conduits may be put into communication with the interior of the article. This may be readily accomplished by the use of a small metallic tube which may be inserted through the wall of the article during the vulcanizing process, and after the vulcanization removed. The hole so made may be then plugged by the use of a soft rubber plug, or by any other desired means, after the vulcanization has been completed.

While the machine I have shown in the figures just described is perfectly capable of use in carrying on my process, it is obvious that various other modifications may be used, and I have shown a second machine in Figures 1 to 6 inclusive. This machine does not differ in principle from that previously described, but simply shows another way of mounting the mold elements and another way of counterweighting. In the modified form of machine, the reference character 78 denotes suitable frame members provided with suitable foot portions 79 and having upright standards 80—80, in the top of which in bearings 81 are provided journals 82, having slots 83 therein for the reception of a shaft 84.

Supported from the journals 81, as shown in Figure 1, by means of arms 85, 85, is suspended the lower half 86 of the mold, and also attached to the journals 82 are counterweights 87, 87, so that the heavy mold element may be easily swung on the bearings.

These counterweights slightly overbalance the mold element so that it has a tendency to assume a more or less vertical position, being held against such movement as will be later explained. To the shaft 84, journalled at its ends in journals 82, 82, there is rigidly attached intermediate the ends an arm 88 attached to the upper half of the mold 89 and provided with a counterweight 90, suspended as will be seen between counterweights 87, 87. By this construction, it will be seen that the upper half of the mold may be swung away from the lower half which remains stationary.

Mounted in a cross-arm 91 between the end standards 80, 80, is a fork 92 provided with an extension 93. The upper ends of the fork 92 bear against the shaft 84 between the journals 82, 82. To the extension or shank 93, is attached an intermediate link 94, forming a toggle with a smaller link 95. The link 95 is rigidly attached to a shaft 96 journalled in the base member 79. Attached to one end of shaft 96, is a crank 97 with a link 98 loosely pivoted thereon, the other end of the link 98 being pivoted on a handle 99 at 100, the handle being pivoted as indicated at 101 in the base member 79.

By the construction above set forth, it will be seen that by moving the handle 99 outwardly to the position shown in Figure 4, the toggle linkage will be forced into a straight line, raising fork 92, and the shaft 84 in the slots 83 in journals 82. This causes the upper half of the mold to be carried away from the face of the lower mold, the faces remaining parallel due to the counterweighting. When the handle is moved to the position shown in Figure 2, the toggle is broken, the shaft is lowered by the lowering of fork 92 and the upper half of the mold comes into contact with the lower half. Inasmuch as the two halves of the mold must make a smooth joint in order to prevent ridges in the vulcanized product, it will be seen that I have provided a simple and effective means for handling the mold. In order to place the material to be vulcanized in the chamber formed between the two halves of the mold, the lower half is swung to horizontal position, the material placed in position and the upper half swung down over it, with the toggle made. The upper half will then have its face parallel to the face of the lower mold but at a slight distance from it. The toggle is then broken, slowly, thus bringing the upper half down until the faces engage, whereupon the two halves are locked together, as will be described later.

Referring now particularly to Figure 2, the upper half 89 of the mold is an annular form having a face member 102 of iron or other suitable metal formed with an annular chamber 103. The face member 102 is provided with flat marginal surfaces as shown and is provided on its outer surface with a hollow annular enclosing member 104 forming a steam chest 105 over the surface of the inner member 102. As shown in Figure 3, the inner surface of member 105 and the outer surface of member 102 may be provided with cooperating baffle plates 106 and 107, bent in the direction of steam flow as shown by the arrows. The member 104 is covered with a coating of lagging material 108 to prevent loss of heat.

The lower half of the mold is provided with a face member 109 having flat margins and having an annular recess formed in its face, as shown at 110. United to member 109, along the margins thereof, is an enclosing member 111, providing a steam chest 112 between members 109 and 111. A coating of lagging 113 is placed over the outer surface of the member to prevent loss of heat.

Suitable baffle plates as shown in Figure 3 are also provided between members 109 and 111.

The chamber formed between face plates or members 102 and 109 when placed in contact is the vulcanizing compartment in which is to be placed the article to be treated. The inner surface of the chamber is accordingly made perfectly smooth and in order to prevent a ridge on the article the plates 102 and 109 are formed with a closely fitting joint member 102 having a recess 114 along its inner margin into which fits a bead 115 on member 109. As indicated at 116, the inner and outer members of the upper half of the mold are united along their peripheries by means of rivets or other means, and the inner and outer members of the lower half-mold are united as shown at 117.

It will be noted that the vulcanizing compartment is formed preferably so as to have substantially flat opposed walls with rounded ends. The modified form of machine is also designed primarily for use in vulcanizing inner tubes and the mold members are annular in form. It will be understood, as has been previously explained, that other forms of molds can be as readily used in accordance with the shape and kind of article to be treated, until modifications being with reference to the mold elements, the other features in the construction of the machine being substantially as shown in the drawings. As has been previously explained also, it is necessary to provide some means by which the various conduits may be put into communication with the interior of the article. In the case of the inner tube the valve stem itself provides a suitable passageway, while in other hollow articles, as for instance as the "bladders" of foot-balls, and other inflated articles of that nature, it is necessary to insert some sort of a tube through the wall of the article during the vulcanizing process. Part of the chamber located in the lower mold element forms more than half of the chamber and this permits of the valve stem of the inner tube to be led through an aperture formed in the solid wall of the chamber rather than through an aperture formed partly in the lower and partly in the upper sections of the chamber wall. The chamber is also made slightly larger than the raw tube which is to be vulcanized so that the tube may be placed therein in collapsed condition and the upper mold element lowered in place without possibility of pinching the tube along the line of junction of the two halves. By the construction of the chamber as described the patch around the base of the valve stem also lies flat against the solid wall of the chamber, and does not overlap the line of junction, thus preventing the formation of a ridge along the patch and insuring that the patch will be securely vulcanized in place.

In order to hold the two halves of the mold securely in position, there are provided a plurality of clamping arms 118, pivotally mounted on the lower half of the mold along the margin of its face plate, which may be swung upwardly to engage in recessed lugs 119, extending from the periphery of the face plate of the upper half. The arms 118 are provided with the usual hand-wheels 120 which may be rotated downwardly to engage with the lugs 119 to lock the halves together.

Steam is supplied to upper and lower halves of the mold separately, by flexible hose 121, and each half-mold has its steam chamber divided by partitions, as indicated at 122, 123, so that when steam is supplied through hose 121 to either side of the partition it flows around through the passageways to the other side of the mold to be taken off through an outlet pipe 124 provided with a forked end as shown. The same construction is used for the lower half of the mold being supplied as shown at 125 through a flexible hose 121 provided with a double end connection, the outlet being through a similar hose 126 to the exhaust steam pipe 127. Suitable valves not shown are provided for the control of the steam flow.

In carrying on the vulcanizing operation, the inner tube is placed in the lower half mold with the valve stem projecting through a suitable aperture as indicated at 128, Figure 1. The upper half-mold is then swung over the lower half and lowered into place, the lower half being provided with a plurality of guiding pins 129, 129, located on its inner margin which engage corresponding apertures in lugs 130 mounted on the inner margin of the upper half mold. The two halves are now clamped tightly together by the clamps described.

At this point it is important to note that when the tube of unvulcanized rubber is deposited in the recess 24 of the lower section of the mold, the latter is lying in a horizontal position. It is also important to note that the cross-sectional area of the lower section of the mold is considerably greater than the cross-sectional area of the upper section of the mold, the construction being such that the major portion of the tube to be vulcanized is received in the lower section of the mold. Inasmuch as the mold sections are heated to the vulcanizing temperature this construction insures that that portion of the tube of unvulcanized rubber extending above the edges of the lower, horizontally disposed mold section, will not fall down or lop over the edges of said lower section, and be pinched in between the meeting edges of the mold section when the upper section is positioned upon said lower section, as hereinbefore described. This unequal division of the horizontally disposed mold sections, so that the greater part of the vulcanizing surface within the mold is located in the lowermost section, I regard as an important feature of my invention, inasmuch as it minimizes the danger of one or more portions of the tube being pinched between the meeting edges of the mold section, and also facilitates the operation of placing the tube in the lower section of the mold, and the positioning of the upper section of the mold upon the latter.

All air within the tube must now be removed and to this end a flexible tube 131, connected to a T 132, is attached to the valve stem. The T 132 is connected by one branch to a shut-off valve 133 and by the other branch to a three-way valve 134. Three-way valve 134 controls the flow between the tube and three pipes, the first, 135 being supplied with air under pressure, the second 136, being an exhaust pipe, and the third 137 being a vacuum pipe. The shut-off valve 133 controls the flow between the tube and a pipe 138 containing a vulcanizing gas of suitable composition. To remove the air from the tube, the valve 134 is turned so as to connect the tube with the vacuum pipe. After this connection is made and the air exhausted, the handle of valve 134 turned so as to cut off the vacuum, and the handle of valve 133 turned so as to admit gas into the tube. This connection is maintained throughout the vulcanizing operation, the gas supply being automatically controlled by a valve of any suitable type.

The complete mold is then swung to the position occupied by the upper half-mold in Figure 4, and the counterweights are made so as to bias the device to the raised position. When it is desired to hold the mold in the position shown in Figure 2, in order to insert a tube, etc., I have provided a locking means such as a suitable spring-pressed locking pin 139, mounted in the frame uprights and engaging with arm 85, so as to prevent the mold from being swung upwardly unless desired. A string or chain 140 is provided so that the pin may be drawn into its recess to permit the mold to be raised.

When the vulcanizing is complete, the mold is swung downwardly, and the valve 133 shut off. The three-way valve is now opened and the gas within the article permitted to exhaust to the atmosphere. The valve is then turned so as to open the vacuum pipe and this removes the residue of the vulcanizing gas, the suction having a tendency also to collapse the inner tube.

The handle of the three-way valve is now turned, opening up first the exhaust pipe to the inner tube, which destroys the vacuum, and then the air pressure pipe, which inflates the inner tube again. The handle is now reversed, exhausting the tube first and then collapsing it under the influence of the suction. The alternate vacuum and pressure is repeated a number of times, the deflation and inflation of the tube serving to loosen it from the inner surface of the mold, where it has a tendency to stick during the vulcanization. The purpose of constructing the three-way valve so that the tube is exhausted between inflation and suction, is to permit of the change in condition to be made gradually so that the tube may not be injured.

In order to permit the upper mold element to be easily handled, I provide a handle 142 mounted on the periphery thereof at a point opposite the counterweighting. There is also provided an automatic valve 141 in the steam main which controls the supply of steam to a number of machines grouped as a battery. By means of the flexible connections the steam admitted to the mold is never shut off, the pressure remaining constant under automatic control. In this way, my molds do not cool down but are maintained at practically a constant heat so that the vulcanizing operation may be carried on rapidly and no delay occurs in bringing the mold to a vulcanizing temperature each time.

It will be seen that my invention provides a small compact machine for vulcanizing individual articles, which is relatively light in weight and easily manipulated. Furthermore, my invention permits of close and accurate control of the vulcanizing process, and prevents injury to the product both in charging the mold, during the process, and in removing the product from the mold after the process is completed. By my invention, the injurious vulcanizing gases are not released into the vulcanizing room at the completion of the operation, and the tube itself may be completely scavenged before being released from the mold.

It will be further seen that my invention provides an arrangement by which the temperature, pressure and composition of the gas which is supplied to the article being vulcanized can be varied in accordance with the quality of the material and also in accordance with the rate at which the vulcanization is to be carried on. Inasmuch as the gas conduits are in communication with the interior of the article throughout the vulcanizing process, it is possible to vary the quality of the gas, the pressure at which it is maintained, and even to remove the gas and substitute a different kind during the vulcanizing process. This is believed to be a feature of the utmost importance in the vulcanizing operation, and is only provided for by reason of the fact that communication is maintained at all times with the interior of the article.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

1. A device of the class described, adapted for the vulcanization of hollow articles, comprising a pair of co-operating mold members adapted to form a vulcanizing chamber therebetween when in contacting relation, the said members being interiorly U-shaped and one member of the said pair of members having the greater internal finished heating surface, each of said members being provided with a steam chest to heat said chamber, and means to supply and extract air and vulcanizing gas to and from the interior of the article contained within said chamber.

2. A device of the class described, adapted for the vulcanization of hollow articles, comprising a pair of co-operating mold members forming a vulcanizing chamber therebetween when in contacting relation, one member of the said pair of members having the greater internal finished heating surface, each of said members being provided with a steam chest to heat said member, and means to supply and extract air and vulcanizing gas to and from the interior of an article in said vulcanizing chamber.

3. A device of the class described, adapted for the vulcanization of hollow articles, comprising a pair of co-operating mold members forming a vulcanizing chamber therebetween when in contacting relation, each of said members being provided with a steam chest to heat said member, and a three-way valve having a vacuum connection and having also connections to supply the article contained within said chamber with gases from a plurality of sources.

4. A device of the class described, adapted for the vulcanization of hollow articles, comprising a pair of co-operating mold members forming a vulcanizing chamber therebetween when in contacting relation, one member of the said pair of members having the greater internal finished heating surface, each of said members being provided with a steam chest to heat said member, and a three-way valve having a vacuum connection and having also means extending through the wall of the said larger mold member to supply the article contained within said chamber with gases from a plurality of sources, and to control the pressure conditions on the interior of said chamber.

5. A device of the class described, adapted for the vulcanization of hollow articles, comprising a pair of similarly pivoted co-operating mold members forming a vulcanizing chamber therebetween when in contacting relation, one member of the said pair of members having a limited vertical movement as a whole, means for balancing the weight of the said members, each of said members being provided with a steam chest to heat said member, and means to connect the article contained within said chamber to a plurality of conduits containing gases at variable temperatures and pressures.

6. A device of the class described, adapted for the vulcanization of hollow articles, comprising a pair of similarly pivoted co-operating mold members forming a vulcanizing chamber therebetween when in contacting relation, one member of the said pair of members having a limited vertical movement as a whole, means for balancing the weight of said members, each of said members being provided with a steam chest to heat said member, and a single means to connect the article contained within said chamber with conduits containing vulcanizing gas and air under pressure, a vacuum conduit and an exhaust conduit.

7. A device of the class described, adapted for the vulcanization of hollow articles, comprising a pair of pivoted co-operating mold members forming a vulcanizing chamber therebetween when in contacting relation, separate balancing weights applied to the said members, detachable devices for connecting the said weights whereby they will operate together, steam chests enclosing each of said members, means to supply a gas to an article contained within said chamber, and the said means including a vacuum connection whereby to inflate and deflate said article by the application of pressure and suction thereto.

8. A device of the class described, adapted for the vulcanization of hollow articles, comprising a frame, upper and lower mold members mounted in said frame and adapted to swing about horizontal axes, said mold members being provided with faces adapted to engage and having recesses co-operating to form a mold chamber, the said upper member having a limited movement vertically as a whole, means to supply a gas to an article contained within said chamber, and the said means including a vacuum connection whereby to inflate and deflate said article by the application of pressure and suction thereto.

9. A device of the class described, comprising a frame, upper and lower mold members pivotally mounted in said frame and adapted to swing about horizontal axes, co-operating faces on said mold members adapted to lie in engaged relation and having opposed recesses adapted to form a vulcanizing chamber, means to swing said upper mold member to a position where its face lies in a plane parallel to the plane of the face of the lower mold member but in spaced relation thereto, and means to shift the axis of said upper member laterally so that the faces of the two members are brought into contact.

10. A device of the class described, comprising a frame, upper and lower mold members pivotally mounted in said frame, and adapted to swing about horizontal axes, co-operating faces on said mold members adapted to lie in engaged relation and having opposed recesses adapted to form a vulcanizing chamber, means to swing said upper mold member to a position where its face lies in a plane parallel to the plane of the face of the lower mold member but in spaced relation thereto, and toggle linkage to shift the axis of said upper member laterally so that the faces of the two members are brought into contact.

11. A device of the class described, comprising a frame, a lower mold member journaled in said frame, an upper mold member provided with a shaft journaled in a slot in the journals of said lower mold member, said mold members being provided with faces adapted to lie in engaged relation and provided with recesses cooperating to form a vulcanizing chamber when said members are in contact, means to swing said upper member so as to bring its face in a plane parallel to the face of said lower member but in spaced relation thereto, and toggle linkage to shift said shaft in its slot, so as to bring said faces in engagement.

12. A device of the class described, comprising a frame, upper and lower mold members pivoted in said frame, said members being provided with faces adapted to engage and recesses in said faces adapted to cooperate to form a vulcanizing chamber, means to swing said upper member into parallelism with said lower member but in spaced relation thereto, and means to shift said upper member laterally so that the faces engage, locking devices to hold said members engaged, and means to introduce a gas into the interior of the vulcanizing chamber.

13. A device of the class described, comprising a frame, upper and lower mold members pivoted in said frame, and having recessed faces adapted to be engaged so as to form a chamber therebetween for the vulcanization of hollow articles, steam chests formed in said members and overlying said recesses, means to swing said upper member into parallelism with said lower member but in spaced relation thereto, means to shift said upper member laterally into engagement with said lower member, guiding means to direct said lateral movement, locking devices to hold said members engaged, and means to introduce gases under varying conditions of temperature and pressure into the article to be confined within said vulcanizing chamber.

14. A device of the class described, comprising a frame, upper and lower mold members pivoted in said frame, and having recessed faces adapted to be engaged so as to form a chamber therebetween for the vulcanization of hollow articles, steam chests formed in said members and overlying said recesses, means to swing said upper member into parallelism with said lower member but in spaced relation thereto, means to shift said upper member laterally into engagement, guiding means to direct said lateral movement, locking devices to hold said members engaged, and a single means to connect the article within the chamber to a plurality of conduits containing gases under variable temperature and pressure conditions.

15. A device of the class described, comprising a frame, upper and lower mold members pivoted in said frame, and having recessed faces adapted to be engaged so as to form a chamber therebetween for the vulcanization of hollow articles, steam chests formed in said members and overlying said recesses, means to swing said upper member into parallelism with said lower member but in spaced relation thereto, means to shift said upper member laterally into engagement, guiding means to direct said lateral movement, locking devices to hold said members engaged, an aperture through the wall of the recess in said lower mold member, and a single means to connect the article within the chamber, by means of the aperture, to a plurality of conduits containing gases under variable temperature and pressure conditions.

16. A device of the class described, comprising a frame, a lower mold member journaled therein and provided with a face portion having a relatively deep annular recess therein, an upper mold member journaled in a slot in the journal of said lower mold member, said upper mold member having a face portion provided with a relatively shallow annular recess, steam chests formed in said members and overlying said recessed portions, means to swing said upper mold member into parallelism with said lower member but in spaced relation thereto, means to shift said upper member laterally into engaged relation with said lower member, whereby said recesses co-operate to form a chamber adapted for the vulcanization of hollow articles, and a valve having a plurality of ports adapted to be connected to the article within said chamber in order to permit of the inflation and deflation of said article by supplying pressure and suction thereto, and means to supply gases thereto at varying temperatures and pressures.

17. A device of the class described, comprising a frame, a lower mold member journaled therein and provided with a face portion having a relatively deep annular recess therein, an upper mold member journaled in a slot in the journal of said lower mold member, said upper mold member having a face portion provided with a relatively shallow annular recess, steam chests formed in said members and overlying said recessed portions, means to swing said upper mold member into parallelism with said lower member but in spaced relation thereto, means to shift said upper member laterally into engaged relation with said lower member, whereby said recesses cooperate to form a chamber adapted for the vulcanization of hollow articles, and means to connect the articles within said chamber with a plurality of conduits, whereby the pressurse within and without said mold may be equalized and whereby a vulcanizing gas may be supplied under pressure to said article and removed by suction.

18. A device of the class described, comprising a frame, a lower mold member journaled therein and provided with a face portion having a relatively deep annular recess therein, an upper mold member journaled in a slot in the journal of said lower mold member, said upper mold member, having a face portion provided with a relatively shallow annular recess, steam chests formed in said members and overlying said recessed portions, means to swing said upper mold member into parallelism with said lower member but in spaced relation thereto, means to shift said upper member laterally into engaged relation with said lower member, whereby said recesses cooperate to form a chamber adapted for the vulcanization of hollow articles, locking devices to hold said members engaged, and a multi-port valve to connect the article within said chamber to sources of air under pressure vacuum, and means to supply a vulcanizing gas, whereby the article may be inflated and deflated and the gas supplied while the vulcanization is being carried on.

19. In a device of the class described, a frame, a lower mold member pivoted in said frame, an upper mold member pivoted in said lower member, said members having recessed faces adapted to be engaged so as to form a vulcanizing chamber therebetween, an aperture in the wall of said lower member for the reception of a tube, a gate for said aperture pivotally mounted in said lower mold member, and adjusting means to place said gate in position with its face flush with the inner wall of the recess in said mold element.

20. In a device of the class described, a frame, mold elements pivotally mounted in said frame and having cooperating recessed faces adapted to form a vulcanizing chamber therebetween when said elements are in engaged relation, an aperture in said lower mold element, a pivoted arm mounted adjacent said aperture, having a gate for said aperture pivotally mounted therein, and adjusting means on said arm whereby to force said gate into contact with the wall of said aperture.

21. In a device of the class described, a frame, cooperating mold members pivotally mounted therein and having recessed faces adapted to form a vulcanizing chamber when said members are in engaged relation, means including lifting rods and wedges connected thereto and adapted to move said members relatively to each other while maintaining the faces in parallel relation, and means to swing said mold elements apart.

22. In a device of the class described, a frame, cooperating mold elements pivotally mounted therein, and having recessed faces adapted to form a vulcanizing chamber when said elements are in engaged relation, means to move one of the said mold elements as a whole with respect to the other while maintained in parallel relation, and to swing them apart into inclined relation thereafter, steam-chests enclosing the surfaces of said mold elements to heat said chamber, and means to supply steam to said chests while said elements are in engaged or separated relation.

23. In a device of the class described, a frame, a pair of mold elements pivotally mounted therein and having cooperating recessed faces adapted to form a vulcanizing chamber therebetween when in engaged relation, steam-chests on said elements to heat said chamber, means to move said elements relative to each other in parallel and swinging relation, an aperture in one of said mold elements for the passage of a tube therethrough, means to supply steam to said chests while said elements are in operative or inoperative position, and means to put the hollow article being vulcanized in communication with a plurality of conduits for gases under varying temperature and pressure conditions.

24. A device of the class described, adapted for the vulcanization of hollow articles, comprising a plurality of cooperating mold members, one of the said members being movable in two directions with respect to another, means to heat said members, and means to supply and exhaust air and vulcanizing gas separately to and from the article being vulcanized in said mold members.

25. A device of the class described, comprising a frame, a lower mold member provided with a counterweighting extension, a pivot in said extension supported in said frame, an upper counterweighted mold member pivotally mounted in said first pivot, recessed faces on said mold members co-operating to form a vulcanizing chamber, means to move said mold members relative to each other while the faces are maintained in parallel relation, means to swing said upper mold member relative to said lower mold member while in the spaced position, and means to swing both members about a single axis while in contacting relation.

26. A device of the class described, comprising a frame, a lower mold member provided with substantially diametrical trunnions supported in said frame, an upper mold member provided with peripheral lugs, pivotally supported thereby in the periphery of said lower mold member, a slotted bearing in the periphery of said lower mold member wherein said lugs are mounted, cooperating recessed faces in said mold members adapted to define a vulcanizing chamber when said mold members are in engaged relation, means to shift said upper mold member in its pivotal mounting relative to said lower mold member the faces being maintained in parallel relation, means including a counterweight to swing said upper mold member on its pivots while the lower mold member remains at rest, means to swing both mold members about a single axis while in engaged relation, heating means for said mold members, and means to introduce a gas into the interior of an article being vulcanized in said chamber.

27. A device of the class described, comprising a frame, a pair of mold members having recessed co-operating faces to form a vulcanizing chamber therebetween when in contacting relation, a slotted pivot mounted on the periphery of one of said mold members, and supported in said frame, a pivot on said second mold member mounted in said slot, means including counterweights to swing the second member on its pivot relative to the first, and also to swing both said members as a unit in the frame, means to shift said mold members relative to each other while the faces remain in parallelism, means to heat said mold members, and means to introduce a gas into the interior of the article being vulcanized in said chamber.

28. A device of the class described, adapted for the vulcanization of hollow articles comprising a plurality of mold members, means to heat said members, and means to introduce gases from a plurality of sources into the interior of the article being vulcanized in said mold, the said gas-introducing means having a vacuum connection and pipes for conveying the extracted gases for a distance from said mold members.

29. A device of the class described, comprising in combination, a mold member having a recessed annular face, a second mold member having a recessed annular face opposed to the face of said first member and cooperating therewith to form a vulcanizing chamber when the faces of said mold members are brought into engaged relation, the recess in said second mold member having straight side walls and a rounded bottom, an aperture in one of said side walls, means to heat said mold members, and means to introduce gases through said aperture into the interior of an article being vulcanized the said gas-introducing means including a vacuum connection whereby air pressure and suction may be applied alternately to the said article.

30. In apparatus of the class described, a mold comprising a pair of sections adapted to be placed together so as to form a tubular chamber adapted to receive a hollow article to be vulcanized, one of said mold sections exceeding the other in cross sectional area, and means for individually heating each of said sections.

31. In apparatus of the class described, in combination, a pair of individually heated mold sections, adapted when placed together to form a circular chamber adapted to receive a tube to be vulcanized, the vulcanizing surface of one of said mold sections being greater than that of the other section.

32. In apparatus of the class described, in combination, a pair of individually heated mold sections, each of which is provided with a circular vulcanizing recess, said mold sections when placed together in opposed relation forming a continuous vulcanizing chamber, the vulcanizing surface of the recess in one of said mold sections being greater than that of the other of said sections.

33. In apparatus of the class described, in combination, a pair of individually heated mold sections, each of which is provided with a circular recess, the recesses of said mold sections, when the latter are placed in opposed relation, forming a circular vulcanizing chamber, the vulcanizing surface of the recess of one of said sections exceeding that of the other, means for holding the mold section having the recess of greater area in a horizontal position when the tube or other article to be vulcanized is inserted therein, and means for conducting a heating medium to each of said mold sections.

In testimony whereof I affix my signature.

WALTER L. FAIRCHILD.